(12) United States Patent
Rowland et al.

(10) Patent No.: US 8,891,720 B2
(45) Date of Patent: *Nov. 18, 2014

(54) FISSION METER AND NEUTRON DETECTION USING POISSON DISTRIBUTION COMPARISON

(75) Inventors: Mark S. Rowland, Alamo, CA (US); Neal J. Snyderman, Berkeley, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 886 days.

This patent is subject to a terminal disclaimer.

(21) Appl. No.: 12/712,040

(22) Filed: Feb. 24, 2010

(65) Prior Publication Data
US 2010/0215138 A1   Aug. 26, 2010

Related U.S. Application Data

(63) Continuation-in-part of application No. 11/233,228, filed on Sep. 21, 2005, now Pat. No. 8,155,258.

(60) Provisional application No. 60/612,968, filed on Sep. 24, 2004.

(51) Int. Cl.
*G21G 1/00* (2006.01)
*G01T 3/00* (2006.01)

(52) U.S. Cl.
CPC ........................................ *G01T 3/00* (2013.01)
USPC ............ 376/156; 376/245; 376/253; 376/159

(58) Field of Classification Search
USPC ........................... 376/254, 156, 245, 253, 159
See application file for complete search history.

(56) References Cited

U.S. PATENT DOCUMENTS

| | | | | |
|---|---|---|---|---|
| 3,456,113 | A * | 7/1969 | Keepin | 376/254 |
| 3,786,256 | A * | 1/1974 | Untermyer | 376/159 |
| 4,099,048 | A * | 7/1978 | Eichenlaub | 377/54 |
| 4,201,912 | A * | 5/1980 | Evans et al. | 376/154 |
| 4,229,654 | A * | 10/1980 | Arya et al. | 250/358.1 |
| 4,350,887 | A * | 9/1982 | Barnard et al. | 250/265 |
| 4,483,816 | A * | 11/1984 | Caldwell et al. | 376/158 |
| 4,617,169 | A * | 10/1986 | Brodzinski et al. | 376/257 |
| 4,617,466 | A * | 10/1986 | Menlove et al. | 250/390.04 |
| 4,920,548 | A * | 4/1990 | Gaussa et al. | 376/255 |
| 6,333,958 | B1 * | 12/2001 | Stewart et al. | 377/10 |
| 6,341,150 | B1 * | 1/2002 | Ivanov et al. | 376/159 |

(Continued)

FOREIGN PATENT DOCUMENTS

JP    06-300887 A  * 10/1994

OTHER PUBLICATIONS

Bhattacharyya, Arnab "The Poisson Distribtuion", MIT Junior Lab, Oct. 2, 2003.*

*Primary Examiner* — Jack W Keith
*Assistant Examiner* — Sharon M Davis
(74) *Attorney, Agent, or Firm* — Staniford & Tomita, LLP

(57) ABSTRACT

A neutron detector system and method for discriminating fissile material from non-fissile material wherein a digital data acquisition unit collects data at high rate, and in real-time processes large volumes of data directly into information that a first responder can use to discriminate materials. The system comprises counting neutrons from the unknown source and detecting excess grouped neutrons to identify fission in the unknown source. Comparison of the observed neutron count distribution with a Poisson distribution is performed to distinguish fissile material from non-fissile material.

9 Claims, 7 Drawing Sheets

(56) References Cited

U.S. PATENT DOCUMENTS

| | | | |
|---|---|---|---|
| 6,509,563 B1 * | 1/2003 | McElroy et al. | 250/291 |
| 8,155,258 B2 * | 4/2012 | Rowland et al. | 376/156 |
| 2005/0105665 A1 * | 5/2005 | Grodzins et al. | 376/157 |
| 2006/0081787 A1 * | 4/2006 | Prasad et al. | 250/391 |

\* cited by examiner

| Multiplicity | 0 | 1 | 2 | 3 |
|---|---|---|---|---|
| Actual Background | 7209176 | 8463 | 43 | 1 |
| Expected Background | 7209166 | 8481 | 34 | 0 |
| Poisson Distribution | 7209136 | 8541 | 5 | 0 |

FISSION METER AND NEUTRON DETECTION USING POISSON DISTRIBUTION COMPARISON

CROSS-REFERENCE TO RELATED APPLICATIONS

This application is a Continuation-In-Part of U.S. patent application Ser. No. 11/233,228 filed on Sep. 21, 2005 and entitled "Fission Meter," and which in turn claims the benefit of U.S. Provisional Patent Application No. 60/612,968 filed by Mark S. Rowland and Neal J. Snyderman on Sep. 24, 2004 and titled "Fission Meter." U.S. Provisional Patent Application No. 60/612,968 filed Sep. 24, 2004 is incorporated herein by this reference. This application is related to co-pending U.S. patent application Ser. No. 11/244,088, filed on Oct. 4, 2005 and entitled "Absolute Nuclear Material Assay."

STATEMENT REGARDING FEDERALLY SPONSORED RESEARCH

The United States Government has rights in this invention pursuant to Contract No. W-7405-ENG-48 between the United States Department of Energy and Lawrence Livermore National Security, LLC.

FIELD

The present invention relates generally to nuclear fission, and more specifically to a system and method for identifying when fission occurs in unknown sources.

BACKGROUND

The detection and interdiction of illicitly trafficked Special Nuclear Material (SNM) is very important in the ongoing anti-terrorist activities undertaken by homeland security agencies. United States Patent Application No. 2005/0105665 by Lee Grodzins and Peter Rothschild for a system of detection of neutrons and sources of radioactive material, published May 19, 2005, provides the following state of technology information: "There is a need to find sources of radiation and other nuclear material that are clandestinely transported across national boundaries. The sources of clandestine nuclear material may be in the form of 'dirty bombs' (e.g., a conventional explosive combined with radioactive nuclides designed to spread radioactive contamination upon detonation), fissile material, and other neutron and radiation emitting sources that may present a hazard to the public. During recent years, the United States government has placed mobile vehicles at strategic areas with gamma ray detectors dedicated to the task of finding fissile material. Atomic explosives may be made from $^{235}$U (Uranium-235), a rare, naturally occurring, isotope of uranium that lives almost $10^9$ years, or $^{239}$PU (Plutonium-239), a reactor-made isotope that lives more than $10^4$ years. $^{235}$U decays with the emission of gamma ray photons (also referred to as 'gammas'), principally at 185.6 keV and 205.3 keV. $^{239}$PU emits a number of gamma rays when it decays, the principal ones being at 375 keV and 413.7 keV. These gamma rays are unique signatures for the respective isotopes. But fissile material invariably contains other radioactive isotopes besides those essential for nuclear explosives. For example, weapons grade uranium may contain as little as 20% $^{235}$U; the rest of the uranium consists of other isotopes. The other uranium and plutonium isotopes reveal their presence by gamma rays emitted by their daughters. For example, a daughter of $^{238}$U emits a high energy gamma ray at 1,001 keV; a daughter of $^{232}$U, an isotope present in fissile material made in the former USSR, emits a very penetrating gamma ray at 2,614 keV; and a daughter of $^{241}$Pu emits gamma rays of 662.4 keV and 722.5 keV."

U.S. Pat. No. 4,201,912 issued May 6, 1980 to Michael L. Evans et al and assigned to the United States of America as represented by the United States Department of Energy, provides the following state of technology information: "A device for detecting fissionable material such as uranium in low concentrations by interrogating with photoneutrons at energy levels below 500 keV, and typically about 26 keV. Induced fast neutrons having energies above 500 keV by the interrogated fissionable material are detected by a liquid scintillator or recoil proportional counter which is sensitive to the induced fast neutrons. Since the induced fast neutrons are proportional to the concentration of fissionable material, detection of induced fast neutrons indicates concentration of the fissionable material."

U.S. Pat. No. 3,456,113 issued Jul. 15, 1969 to G. Robert Keepin and assigned to the United States of America as represented by the United States Atomic Energy Commission, provides the following state of technology information: "An apparatus and method of detecting, identifying and quantitatively analyzing the individual isotopes in unknown mixtures of fissionable materials. A neutron source irradiates the unknown mixture and the kinetic behavior of the delayed neutron activity from the system is analyzed with a neutron detector and time analyzer. From the known delayed neutron response of the individual fission species it is possible to determine the composition of the unknown mixture. Analysis of the kinetic response may be accomplished by a simple on-line computer enabling direct readout of isotopic assay."

Traditional neutron detectors that have been used to augment gamma-ray detection systems typically rely on "gross-counting" detect an increased neutron presence that may provide an indication of elevated fission from an unknown source. However, current count-based neutron detectors are generally unable to distinguish neutrons in the environmental background from those emitted by a neutron source. Such gross-counting instruments are especially problematic in situations where the neutron count rate is up to ten times the average background. Count rates above this level are usually readily detectable with counter instruments; count rates below this level, however, pose major problems due to the potential triggering of false alarms.

The radioactive decay of fissile material produces alpha particles which, in turn, produce neutrons through an ($\alpha$, n) reaction with light elements within the sample. Depending upon the relative amount of unknown source material in a sample, the vast majority of detected neutrons may be from the ($\alpha$, n) reactions instead of the spontaneous fission of the fissile material. Fission events, however, produce multiple neutrons (e.g., two or three) simultaneously, whereas ($\alpha$, n) reactions produce neutrons individually and randomly. Coincident counting systems utilize this time distribution difference to distinguish prompt fission neutrons from ($\alpha$, n) neutrons.

A coincidence counter identifies neutron counts that occur within a short time of each other (i.e., practically simultaneously). In general, coincident detections can be real or accidental in nature. Real coincidences occur when multiple particles are detected that originate from the same reaction, and accidental coincidences occur when two particles are detected in the measurement window, but are not from the same reaction. Particles in these measurements originate primarily from three reactions: spontaneous and induced fission, ($\alpha$, n) on oxygen, and gamma-ray decay. Accidental coincidence rates are proportional to the size of the measurement gate window. For fast coincidence methods, the coincidence gate is typically kept very short (e.g., 50 ns). Most techniques use a reals plus accidentals (R+A) gate and an accidentals (A) gate and determine the reals rate by the formula R=(R+A)−A.

Some present known coincidence counting techniques define measurement windows that presume that the A window is uncorrelated with the R+A sum. That is, the calculation is based on the assumption that the A gate only contains accidental correlations. Such an assumption is incorrect, since the fission process does not necessarily stop after the end of the A gate, and therefore, real correlations may be rejected simply because they occur during the A gate period.

SUMMARY

Embodiments of the present invention provide a neutron detection system that can be used to discriminate fissile material from non-fissile material. In general, a fissile material is one that is capable of sustaining a chain reaction of nuclear fission. The detection system comprises a low cost digital data acquisition unit that collects data at high rate and in real-time processes large volumes of data directly into information that a first responder can use to discriminate materials. In the following description, numerous specific details are introduced to provide a thorough understanding of, and enabling description for, embodiments of the neutron detection system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A standard approach to locating neutron sources is to use a neutron detector to look for count rate increases above background patterns. Given the number of legitimate neutron sources used in industry, deploying standard neutron detectors will result in a large number of alarms that will need to be resolved by more intrusive inspections. Embodiments of the present invention provide a simple way to discriminate the commonly used neutron sources from illicit (fissile) neutron sources. This technique functions in a passive mode much like a standard portal monitor. Embodiments also provide a system for converting the technique to an active interrogation scheme.

Embodiments of the system identify when fission is occurring by providing an analysis of the range of simultaneous neutrons. Fission is defined as the emission of multiple neutrons after an unstable nucleus disintegrates. For example, Pu240 decays at a rate of about 400 fissions per second per gram of Pu240 atoms. When the fission occurs, multiple neutrons are emitted simultaneously, with the number ranging from zero to eight neutrons. This simultaneous neutron emission characteristic is unique to fission.

Embodiments provide a method of identifying fission from an unknown source. The method comprises the steps of counting neutrons from the unknown source and detecting excess grouped neutrons to identify fission in the unknown source. In one embodiment the step of detecting excess grouped neutrons includes plotting a Poisson count distribution on top of a measured count distribution, such that the mean count of the data is the same as that of the Poisson curve, and discerning differences attributed to fission in the unknown source.

A fission meter apparatus for identifying fission from an unknown source is also described. The fission meter apparatus comprises a multiplicity counter that looks for a range of excess neutrons from the unknown source, a neutron detector operatively connected to the multiplicity counter, and a calculating system operatively connected to the neutron detector that is set up to compute a difference between actual and expected neutron group sizes, which then positively identifies fission in the unknown source. In one embodiment, the calculating system is a system for plotting a Poisson count distribution superimposed over a measured count distribution, such that the mean count of the data is the same as that of the Poisson curve. The apparatus includes a graphing component that displays the plot of the neutron distribution from the unknown source over a Poisson distribution and a plot of neutrons due to background or environmental sources. A known neutron source can be placed in proximity to the unknown source to actively interrogate the unknown source in order to accentuate differences in neutron emission from the unknown source from Poisson distributions and/or environmental sources.

Although the described embodiments are susceptible to modifications and alternative forms, specific embodiments are shown by way of example, and it should be noted that the invention is not limited to the particular forms disclosed. The described embodiments cover all modifications, equivalents, and alternatives falling within the spirit and scope of the invention as defined by the claims.

BRIEF DESCRIPTION OF THE DRAWINGS

Embodiments of the present invention are illustrated by way of example and not limitation in the figures of the accompanying drawings, in which like references indicate similar elements and in which.

INCORPORATION BY REFERENCE

Figure 1:
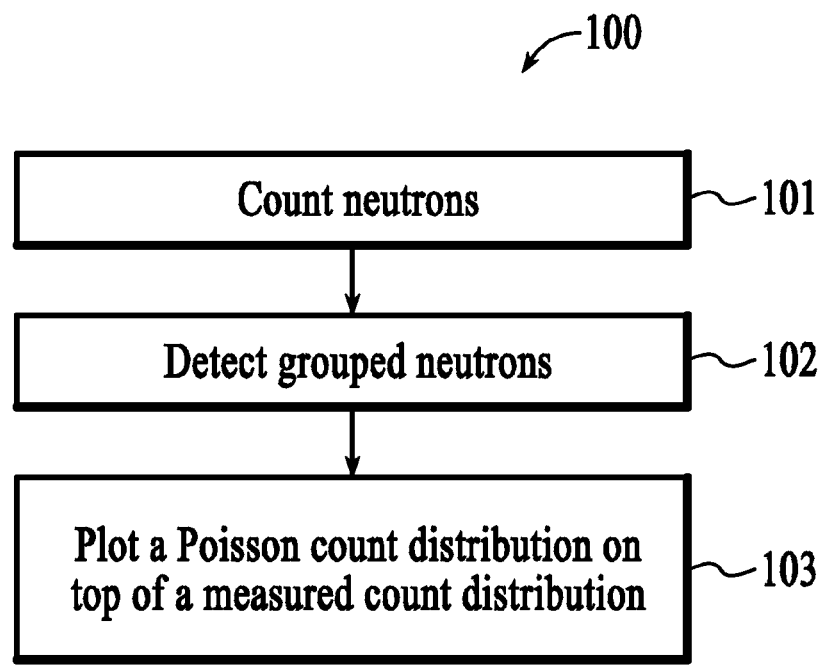
FIG. 1 illustrates a method of detecting fission from unknown and potentially dangerous sources of nuclear radiation, under an embodiment.

Each publication, patent, and/or patent application mentioned in this specification are herein incorporated by reference in its entirety to the same extent as if each individual publication and/or patent application was specifically and individually indicated to be incorporated by reference.

DETAILED DESCRIPTION OF THE INVENTION

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

FIG. 1 illustrates a method of detecting fission from unknown and potentially dangerous sources of nuclear radiation, under an embodiment. A system implementing the method first counts neutrons emitted from the source, block 101. It then detects grouped neutrons, block 102, and then plots a Poisson count distribution on top of a measured count distribution, block 103. An embodiment of the system 100 comprises plotting a Poisson count distribution over a measured count distribution, such that the mean count of the data is the same as that of the Poisson curve. The difference between the two superimposed distributions (curves) is then analyzed to discern neutron emission that may be attributed solely to fission in the unknown source.

A Poisson distribution or curve is a discrete probability distribution that expresses the probability of a number of events occurring in a fixed period of time if these events occur at a known average rate and are independent of one another. The Poisson distribution formula is as follows: $f(k;\lambda)=(e^{-\lambda}\lambda^{k}/k!)$ where k is the number of occurrences of an event and $\lambda$ is a positive real number of the expected number of occurrences during the given interval.

A system implementing the method of FIG. 1 can be used for mobile or stationary monitoring and characterization of the type of neutron sources inside packages and closed containers. Some examples of uses of such a system include inspection of packed cargo containers and trucks. Embodiments of the present invention can be used for preventing illicit trafficking of fissioning nuclear material, for managing inventories of nuclear material, and for managing waste streams of nuclear material. This system is particularly useful where it is desirable to have a simple, quick approach that minimally trained operators can use to improve the control of fissioning material.

In physics, fission is defined as the emission of multiple neutrons after an unstable nucleus disintegrates. For example, Pu240 decays at a rate of about 400 fissions per second per gram of Pu240 atoms. When the fission reaction occurs, multiple neutrons are emitted simultaneously, with the number ranging from zero to eight neutrons. The present invention provides a system that can be used to identify when fission occurs by looking for the range of simultaneous neutrons. This simultaneous neutron emission characteristic is unique to fission. Embodiments are directed to a system that includes a multiplicity counter and a neutron detector that is set up to observe the presence of time grouped neutrons in order to detect the simultaneous emission of neutrons.

The method and system corresponding to that illustrated in FIG. 1 has many uses. For example, one use of the method comprises preventing illicit trafficking of fissioning nuclear material. Another use of the method comprises management of inventories of nuclear material. Another use of the method comprises management of waste streams of nuclear material. The method and system of FIG. 1 is particularly useful where the desire is to have a simple, quick approach that minimally trained operators can use to improve the control of fissioning material. The operators, for example may include border or traffic police, baggage handlers or freight companies, or for international treaty agreements that endeavor to identify, segregate, or manage the world's inventories of nuclear material.

Figure 2:
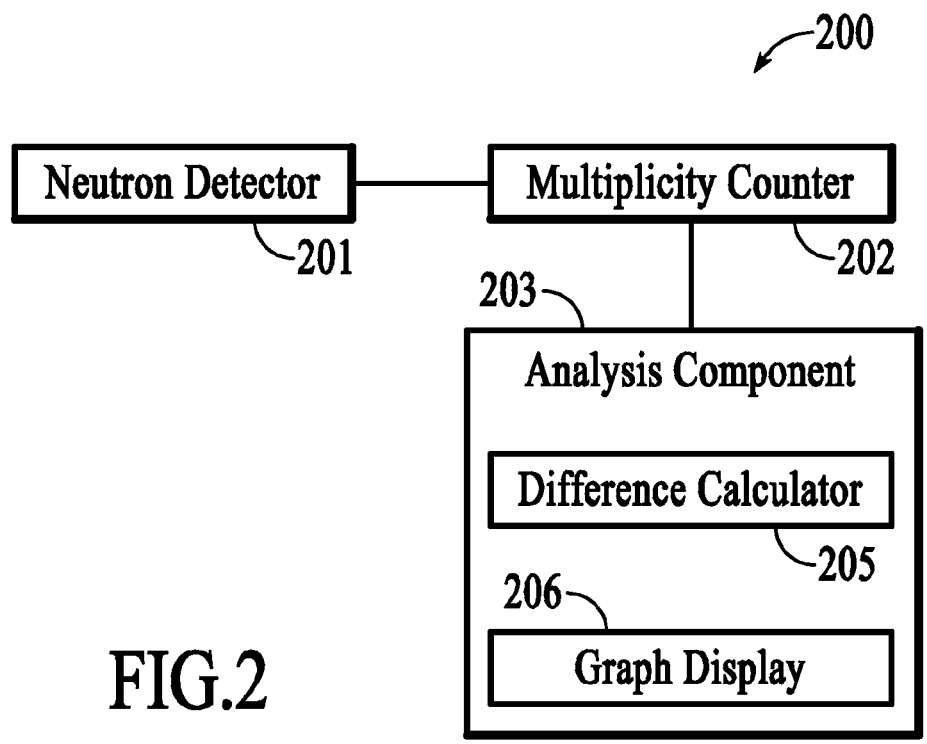
FIG. 2 illustrates a system for detecting fission from unknown and potentially dangerous sources of nuclear radiation, under an embodiment.

Referring now to FIG. 2, another embodiment of a system constructed in accordance with the present invention is illustrated. This embodiment of the system is designated generally by the reference numeral 200. The system 200 comprises a number of interconnected structural components. A neutron detector 201 detects neutrons, and a multiplicity counter 202 looks for a range of simultaneous neutrons from the unknown source. A calculator 203 calculates the difference between a standard Poisson distribution of neutrons and the actual distribution of neutrons emitted by the unknown source. The neutron detector 201 is operatively connected to the multiplicity counter 202. The calculator 203 is operatively connected to the multiplicity counter 202 and is set up to see time grouped neutrons to see simultaneous neutrons and identify fission from the unknown source.

The system 200 provides a simple way to discriminate the commonly used neutron sources from illicit (fissile) neutron sources. The system 200 comprises a fission meter apparatus for identifying fission from an unknown source. The fission meter apparatus 200 comprises a multiplicity counter 202 that looks for a range of excess neutrons from the unknown source, a neutron detector 201 operatively connected to the multiplicity counter, and a calculating system or analysis component 203 operatively connected to the multiplicity counter 202 that includes a difference calculator 205 to compute a difference between actual and expected neutron group sizes, which then positively identifies fission in the unknown source. In one embodiment the analysis component 203 also includes a graph display component for plotting a Poisson count distribution and graphically displaying it as superimposed on a measured count distribution, such that the mean count of the data is the same as that of the Poisson curve.

In one embodiment, the detector 201 is a neutron detector subsystem that consists of multiple moderated 7.5 atmosphere Helium-3 ($^3$He) neutron detectors. The detector subsystem includes high voltage supplies for the Helium tubes and preamplifier or discriminator units required to achieve the pick-off of the neutron events. Depending upon configuration, the detector may consist of two or more large avalanche photodiodes viewing a gas volume filled with the pressurized Helium. Neutrons are detected through scintillation of the Helium. A wavelength shifting process, such as that known to those of ordinary skill in the art, is used to measure the degree of scintillation in order to provide a measure of neutron count in the photodiodes. The detector 201 gathers the neutron data and analyzes the data for coincidences, which are doublets, triplets, quads, or any multiplet up to a high order. Neutron multiplicities in various time sub-gates during each data acquisition cycles are recorded. An acquisition cycle may be defined as 512 time bins. In one embodiment, the multiplicity counter 202 comprises an electronic subsystem that processes the count data from the detection system. The relative time intervals between neutrons arriving at the detector are measured to build a statistical distribution of the multiplicity of the neutron detection. In one embodiment, the multiplicity counter takes each detected neutron and looks in up to 512 time interval gates to record the time interval between each neutron and others in the data stream from the detector.

The time bins define counting gates that are triggered by a trigger conditions. The trigger condition may be the detection of a first neutron. The detection of additional neutrons after the trigger neutron and within the time bin constitutes a pair, or more, of observed neutrons.

As further shown in FIG. 2, the analysis component 203 includes a difference calculator that analyzes the output from the multiplicity counter to determine if it is consistent with a background noise, an innocent source, or a potentially dangerous radioactive source. The analysis component 203 includes a difference calculator 205, which calculates the difference between the unknown source and a standard Poisson distribution, and a graph display that displays the neutron emission distribution of the unknown source and the Poisson distribution in a superimposed graphical representation. In one embodiment, the analysis component 203 performs an analysis of the neutron multiplicity data through a Feynman Variance Technique, or equivalent method.

In one embodiment of the system 200, the analysis component 203 includes a plotting system for plotting a Poisson count distribution on top of a measured count distribution, such that the mean count of the data is the same as that of the Poisson curve. In one embodiment of the system 200, the plotting system 203 is a computer. The system 200 provides a neutron detector that can be used to discriminate fissile material from non-fissile material. It comprises a low cost digital data acquisition unit that collects data at high rate, and in real-time processes large volumes of data directly into information that a first responder can use to discriminate various types of materials.

Neutron Count Plots

One significant characteristic of fission is that neutrons emit in groups. Random sources of neutrons are emitted with no regard for grouping, however, since the appearance of these neutrons at the detector are randomly spread in time, some may accidentally appear in close temporal proximity. An example is a neutron detector that counts neutrons for short periods of time, for example ½ millisecond time periods (gate periods). This example time corresponds to a typical neutron diffusion time in a typical detector, the choice of which depends on specifics related to detector design. If the ½ msec. period is counted once, the count may be one, two, or three counts, or some other integer number, including zero. It is desirable to select an appropriate observation time, such as two to three times the typical neutron diffusion time, and then repeat the sampling of counts period many times to produce a histogram of counts described as the number of occurrences of each multiplet group. This yields a distribution of the number of times (e.g., 0, 1, 2, 3) that neutrons were observed over a number of detection periods (e.g., 10,000 repeated periods).

Figure 3A:
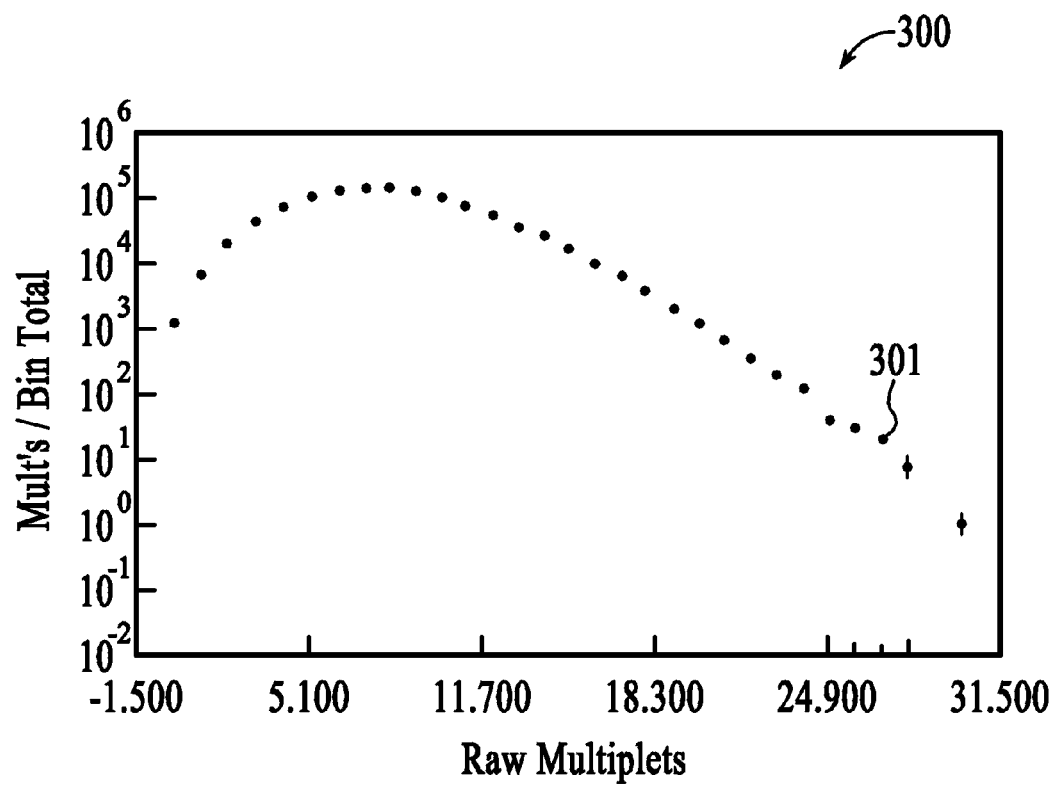
FIG. 3A illustrates an example plot of the count distribution of the frequency of neutrons emitted from an unknown source counted in a defined duration count gate.

FIG. 3A illustrates an example plot of the count distribution of the frequency of neutrons from an unknown source counted in a 512 microsecond count gate. For the example plot 301 of FIG. 3A, it can be seen that eight neutrons were observed $10^5$ times and 25 neutrons were observed about 100 times. The observed plot 301 provides an indication of the detection of coincidental neutrons (e.g., two or more neutrons emitted within a defined time period after detection of the first neutron) during a particular time gate.

Fission is unique in that it creates real correlations, while non-fission neutron sources create accidental correlations. Embodiments provide a method and system that utilizes new developments in how fission neutron chains are modeled to simplify and remove problems related to the assay of unknown packages of fissioning material.

Counting neutrons by looking for time-correlated groupings is called multiplicity counting. The groupings arise from the fission process where a portion of a fission chain is detected. The analysis of this type of data assists in deriving mass, multiplication, detector efficiency, and alpha ratio (mMeA). Other factors in the analysis include neutron lifetime ($L=1/\lambda$), measurement gate width (T), the maximum size of neutron multiplets observed (n), the background correlation and count rate (B), and the generalized Poisson exponent ($\lambda$).

Figure 3B:
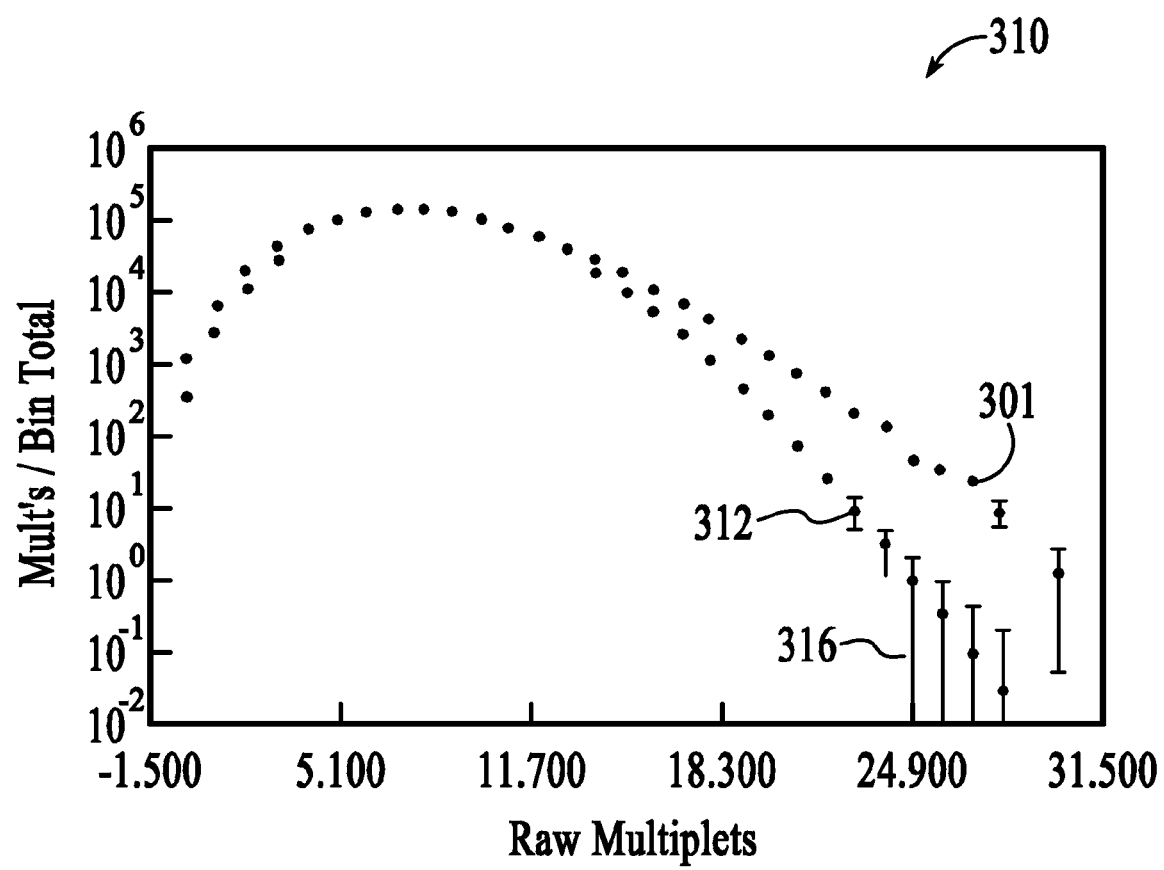
FIG. 3B shows a plot of a Poisson count distribution on top of the measured count distribution.

Referring now to FIG. 3B, a plot further illustrates the embodiments 100 and 200. The plot is designated generally by the reference numeral 310. The top curve 301 is a count distribution of the frequency of neutrons from an unknown source counted in a 512 microsecond count gate, such as that illustrated in FIG. 3A. For example, eight neutrons were observed $10^5$ times and 25 neutrons were observed about 100 times. The bottom curve 312 is a Poisson count distribution with the same mean count, i.e., about seven. As can be seen in FIG. 3B, there is an increase in frequency of data above the Poisson points. That is, the actual distribution curve 301 exhibits a greater number of observed neutrons above the mean count than does the Poisson curve 312. This represents an excess number of emitted neutrons from the unknown source over the statistically expected number represented by the Poisson curve 312. If an operator observes such an excess, either visually or via a numerical subtraction, then fission is identified. The actual amount of excess that triggers the detection of fission is defined by the constraints of the system and normal operating practice. The error bars 316 represent a range of error assigned to each count. If the actual number of neutrons exceeds the Poisson number but is within the error range, then fission may not be cause of such excess. However, if the actual number of neutrons exceeds the error range of the Poisson count by a pre-defined amount, then such an excess may be attributed to fission.

Figure 3C:
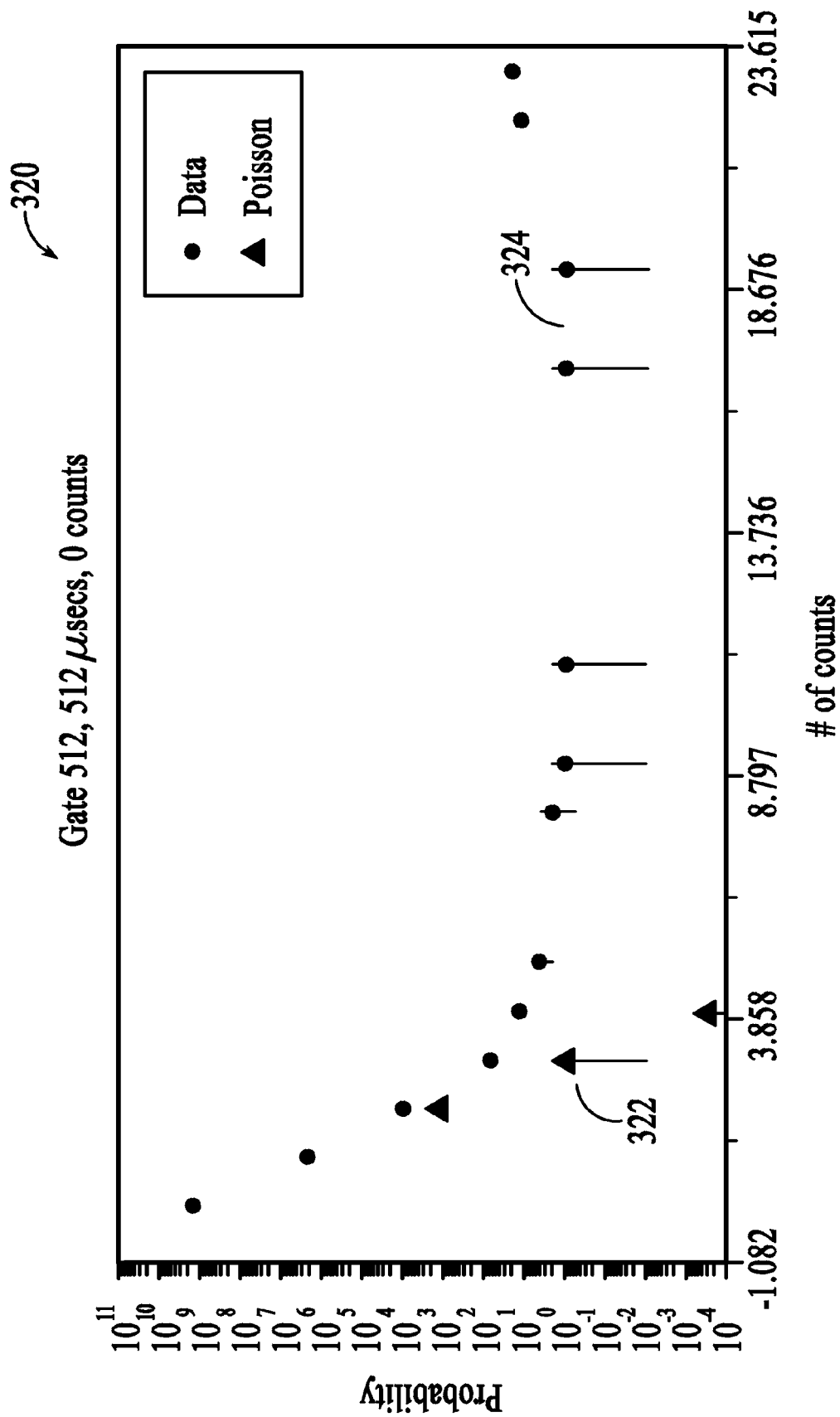
FIG. 3C shows a plot of a Poisson count distribution compared to background radiation.

In general, the presence of background radiation (e.g., cosmic rays) may be a factor in any detection process. However, methods of the fission meter plot described herein are still useful and generally not overwhelmed by background effects. In certain cases, a very weak fission source may be overwhelmed by combinations of background noise, however, a fission source that is practically detectable will have a count distribution curve that is similar to the Poisson distribution, as shown in FIG. 3B. Embodiments include a method for distinguishing background radiation to further refine the detection of fissioning material. Background radiation may be correlated to some degree, but has a very distinct count distribution curve. It has a flattened out portion after a certain number of counts, and does not monotonically decrease, as does a Poisson distribution. FIG. 3C shows a plot of a Poisson count distribution compared to background radiation. As shown in FIG. 3C, a count distribution for observed background data 324 is plotted relative to a Poisson distribution 322. A pure background source will show a curve that flattens or has a kink shape around counts 3 or 4, as shown in FIG. 3C. Therefore, a detectable radiation source will have a count distribution that resembles the Poisson shape, but with no kink, and, depending on its strength, it will overwhelm the background effects in the 3 and 4 count region. The practical range of filtering out background depends on various parameters associated in specifying a neutron detector, such as efficiency, distance from source, and so on. In a typical application, background count rates may be on the order of 3.5 counts/second (cps). A Cf (Californium) fission source with Multiplication=1 typically makes one million neutrons per second; at a distance of one meter, the detector efficiency is around 1% so the count rate would be thousands of cps. Such an example overwhelms the background effects. For a significant amount of fissioning material (e.g., tens of kilograms of uranium), for which the Multiplication=10, at one meter the count rate is 3 cps so the total count rate would be 6.5 cps. There is a clear deviation of 3, 4, 5, counts because of the multiplication, and the higher multiplets overwhelm background even though the count rate is near background. Through the graph display process 206, the generated count distribution plots will show that there is no "flat" tail on the observed count plots, unlike the background data shown in FIG. 3C. Thus, this method provides a means of distinguishing true fissioning sources from mere background and provides a basis for comparing a non-background source with a Poisson distribution. For cases in which the detector is within range of a signal from a fissioning source, it will report a distinction from both Poisson and background correlation.

The method and systems 100 and 200 comprise a first step of counting neutrons from the unknown source and a second step of detecting excess grouped neutrons to identify fission in the unknown source. In another embodiment the method and systems 100 and 200 comprise the steps of counting neutrons from the unknown source and detecting excess grouped neutrons to identify fission in the unknown source wherein said step of detecting excess grouped neutrons to identify fission in the unknown source includes plotting a Poisson count distribution on top of a measured count distribution, such that the mean count of the data is the same as that of the Poisson curve, and discerning differences attributed to fission in the unknown source. In another embodiment the method and systems 100 and 200 comprise the steps of counting neutrons from the unknown source and detecting excess grouped neutrons to identify fission in the unknown source includes plotting a Poisson count distribution on top of a measured count distribution, such that the mean count of the data is the same as that of the Poisson curve, and discerning differences attributed to fission in the unknown source and wherein said step of discerning differences attributed to fission in the unknown source comprises discerning visible differences in said Poisson count distribution superimposed over a measured count distribution plot that are attributed to fission in the unknown source.

The process illustrated in FIG. 3B of plotting the multiplet structure of the Poisson distribution and comparing it in a multiplet-by-multiplet fashion with the observed distribution is unbiased by any expectation that the triggering event (e.g., a trigger neutron) is the correct neutron with regard to whether it is a real or accidental. This automatically alerts the user to the correct and exact expected rate of accidental multiplets greater than one, and prevents the problem caused by systems that assume that all counts within the A gate are accidentals, which leads to the possible rejection of valid correlation information.

In general, neutrons are used in many industrial applications. Neutron signatures also indicate the presence of fissioning nuclear material. It is desirable to be able to separate benign industrial neutron sources from fission sources. Traditionally, detection of nuclear material has been accomplished by neutron counting. If neutron sources were rare, the misinterpretation of any neutron source as a fission source would be of little consequence. However, with the large scale introduction of nuclear monitoring equipment in daily commerce comes the need to not confuse the traffic of industrial sources with illicit traffic.

The method and systems 100 and 200 provide the basis for a visual or automated comparison of raw count distribution data, to a Poisson distribution with the same mean count, to show graphically the intuitive sense that the characteristic of fission is present. Optimally, the excess correlation, above a Poisson rate of correlation, may be alternatively or additionally provided by observing that numerical characteristics of the data and the corresponding Poisson distribution may be computed to form a numerical difference, redundantly indicative of fission.

The characteristic of fission is that neutrons emit in groups. That is, potentially dangerous unknown sources emit multiple coincident neutrons. This simultaneous emission is used in a detector to distinguish from random sources of neutrons that are emitted with no regard for grouping; however, since the appearance of these neutrons at the detector are randomly spread in time, some may accidentally appear in close temporal proximity. For example, consider a neutron detector that counts neutrons for short periods of time, say ½ millisecond. This example time period corresponds to a typical neutron diffusion time in a typical detector, the choice of which depends on the detector design and is not the subject here. If the ½ millisecond period is counted once, the count may be three counts, or some other integer number, including zero. One is expected to select an appropriate observation time, two to three times the typical neutron diffusion time, and then repeat the sampling of counts period many times to produce a histogram of counts described as the number of occurrences of each multiplet group. (i.e., number of times 0, 1, 2, 3 . . . were observed, in sum, over say 10,000 repeated detection periods.)

Fission is unique in that it creates real correlations, while non-fission neutron sources create accidental correlations. Unrecognized is the relative histogram comparison of the measured or unknown neutron source, with a mathematically generated count histogram that represents the hypothetical case of no fission. Visually, in isolation, one histogram looks like another. Embodiments of the detector system include a histogram display system that allows direct graphical comparison of the measured source to the mathematically generated or Poisson distribution. The shape of the measured source histogram is derived from the characteristics of the measured unknown source. Graphically, this is illustrated in FIG. 3B. For the example of FIG. 3B, the tail portion of the histogram 301 is above the random or Poisson histogram 312. This excess correlation is due to fission, illustrating that a simple plot of data collected in one measurement, can be analyzed with a relatively simple procedure involving straightforward observation and comparison. Alternatively, it is possible to compute various quantities in order to derive mathematical count differences between the histograms in order to obtain numeric measures of excessive neutron emission. Threshold values can be defined such that automated processes can indicate the presence of a potentially dangerous source if the difference between the measured count exceeds the Poisson count in excess of the threshold.

One example of an alternative embodiment to the histogram overplot concept is to numerically compute quantities based on the single measurement of an unknown source. Conceptually, the objective is to realize that the differences apparent in a comparison of histograms may be described as the number of pairs of counts observed in the unknown minus the number of count pairs expected if there were no fission (but the neutrons came from a non-fissioning neutron source).

# of pairs observed−expected random # of pairs

If the difference is zero, then the observed neutron source is not undergoing neutron fission. The number of pairs is only one example of a statistical quantity derivable from the measured histogram. Others might be the third or fourth moment of the histogram.

In an alternative embodiment to the graphical histogram approach involves an analysis of the number of pairs of neutrons. As stated above, pairs of neutrons in excess of those expected is the test. Numerically this may be computed from the measured histogram:

$$\sum_{n=0}^{\infty} \frac{\frac{n(n-1)}{2}}{2\sum_{n=0}^{\infty} Cn} Cn - \left(\frac{\sum_{n=0}^{\infty} nCn}{\sum_{n=0}^{\infty} Cn}\right)^2 \cdot 1/2$$

This difference represents the absolute number of pairs in excess of that expected from a non-fissioning neutron source. In the above equation: n is the x-axis of the histogram and is the size of the group of neutrons observed, and Cn is the number of times that a group of n neutrons was observed after repeating the ½ millisecond. measurement a statistically large number of times. Note that the mean count of the measured histogram defines the histogram of the expected or hypothetical non-fission histogram. The mean count of the measurement is:

$$\text{c-bar} = \overline{c} = \frac{\sum_{n=0}^{\infty} nCn}{\sum_{n=0}^{\infty} Cn}$$

The histogram expected from a non-fission source will have the same C-bar, however the shape of the histogram will be described by:

$$\text{Cn-poisson} = \frac{\overline{c}^n}{n!} e^{-\overline{c}}$$

In the above equation, n is the count group size. Whether the system simply plots Cn-Poisson on top of the measurement, as in the first embodiment, or computes difference quantities, as in the second embodiment, they represent the same insight that a uniquely observable fission neutron signature can be created from a single measurement, and can be useable by minimally trained operators to separate high value objects from common industrial sources.

Figure 4:
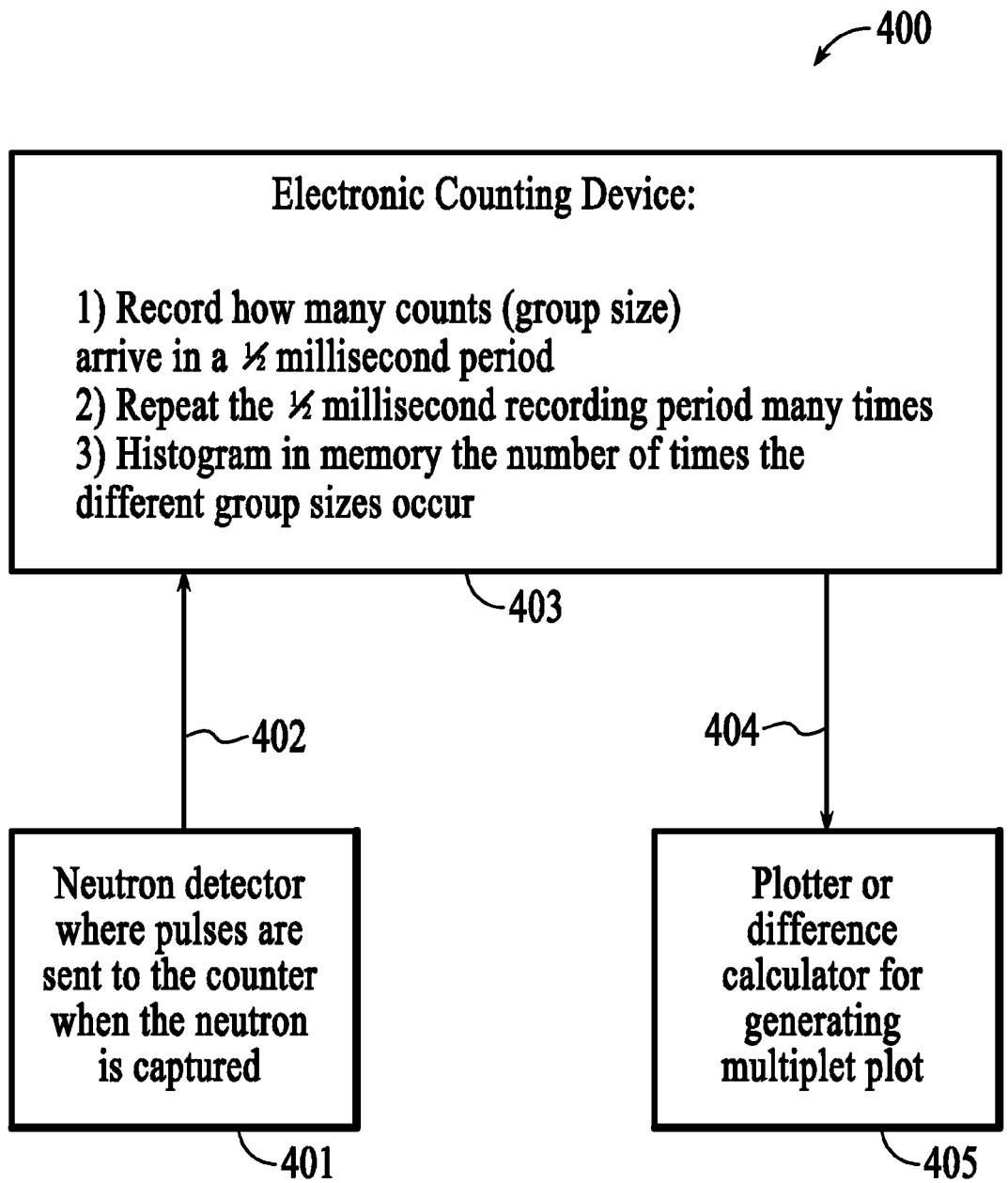
FIG. 4 illustrates another embodiment of a system constructed in accordance with the present invention.

Referring now to FIG. 4, another embodiment of a system constructed in accordance with the present invention is illustrated. This embodiment of the system is designated generally by the reference numeral 400. The neutron detector 401 detects neutrons. The neutron detector 401 is operatively connected to a counter 403. The arrow 402 illustrates pulses sent from the detector 401 to the counter 403. Pulses are sent to the counter 403 when neutrons are captured.

The counter 403 and is set up to see time grouped neutrons to detect simultaneous neutrons and identify fission from the unknown source. The counter 403: (1) can record how many counts (group size) arrive in a ½ millisecond period, (2) repeat the 1.2 millisecond recording period many times, and (3) plot a histogram of the number of times the different group sizes occur. The counter 403 counts the neutrons emitted from the radiation source, and for a defined measurement time period, determines the number of times that a group of n simultaneously emitted neutrons is observed from the radiation source after the measurement time period is repeated a certain number of times, in order to derive a neutron count measurement.

The counter 403 is operatively connected to a plotter or difference calculator 405. The arrow 402 illustrates information from the counter 403 being sent the plotter or difference calculator 405. The system 400 provides a simple way to discriminate the commonly used neutron sources from illicit (fissile) neutron sources. In one embodiment, a system plots a Poisson count distribution on top of a measured count distribution, such that the mean count of the data is the same as that of the Poisson curve. Such a comparison plot is shown in FIG. 3B.

In one embodiment, the neutron detector is used in a portable neutron source identification system that helps detect the presence of illicit radioactive material for use in homeland security applications. Such material can be used in deadly terrorist weapons such as Improvised Nuclear Devices (IND) or state-built nuclear weapons. In general, these weapons require the presence of a so-called Special Nuclear Material (SNM), that is, Uranium or Plutonium, to create a nuclear explosion. Traditional methods of detecting and identifying the presence of SNM involve the use of gamma-ray detection. These methods, however, can be defeated through the use of heavy metal shielding. The neutron detector according to embodiments augments the technique of gamma-ray detection by identifying fission neutron sources by examining the inherent characteristics of the neutron decay process. The neutron detector under embodiments includes processing and filtering components that not only count neutrons, but check the source and environmental conditions for the existence of neutron sources beyond simple noise or environmental effects. Such a detector allows for the rapid and relatively certain detection of neutron sources from potentially dangerous sources, such as INDs or similar weapons.

A neutron source can be any of a variety devices that emit neutrons, irrespective of the mechanism used to produce the neutrons. Depending upon variables including the energy of the neutrons emitted by the source, the rate of neutrons emitted by the source, the size of the source, neutron source devices can be found in a diverse array of applications in areas of physics, engineering, medicine, nuclear weapons, petroleum exploration, biology, chemistry, nuclear power and other industries. Man-made sources include reactors that produce neutrons that can be used for experiments, and spallation sources that are high-flux sources, in which protons that have been accelerated to high energies hit a target material, prompting the emission of neutrons.

Figures 5, 6:
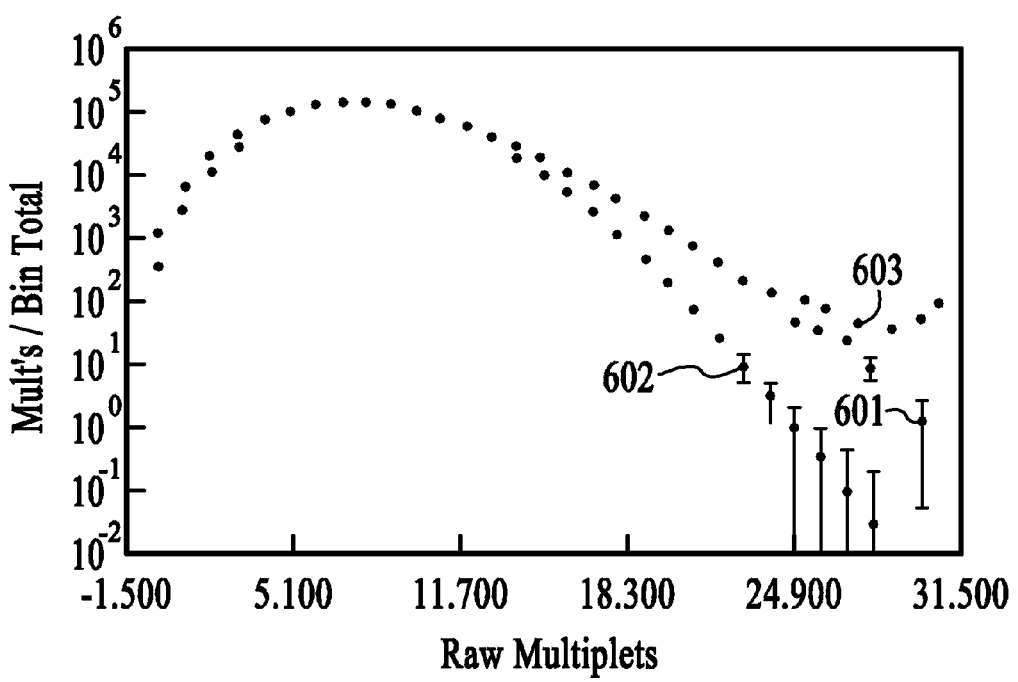
FIG. 5 is a table that illustrates a background count distribution.
FIG. 6 illustrates a neutron distribution curve illustrating a cosmic source.

In one embodiment, the neutron detection system includes a method for allowing the filtering of background neutron noise due to other sources, such as cosmic or man-made sources. Typical background consists of single neutrons and neutron groups from multiple neutron events caused by cosmic rays. The Poisson distribution of the events will cause some random coincidence events. These random coincidences can be calculated using the singles count rate and device characteristics. FIG. 5 is a table that illustrates a background count distribution for an example time period. For table 500 of FIG. 5, data was collected for a period of one hour resulting in a count of 8552 for a count rate of 2.31 counts per second (cps).

FIG. 6 illustrates a neutron distribution curve illustrating a cosmic source. In one embodiment, the simple observation of a neutron distribution curve with a shape like that shown in FIG. 3A would indicate the presence of neutrons due to cosmic interference. Correlation is indicated by the presence of events with higher order multiplicity in the distribution. As shown in FIG. 6 the actual background 603 is slightly more correlated than the neutron distribution from the unknown source 601, and both are more correlated than the pure Poisson distribution 602. Such an effect is also shown in FIG. 3C. As shown in FIG. 6, the actual background curve 603 has a characteristic and relatively pronounced curve up at the very end of the plot. The shape of curve 603 can be used by an analyst or a program to determine whether or not the presence of neutron emission is due to cosmic effects as opposed to a potentially dangerous source.

Figure 7:
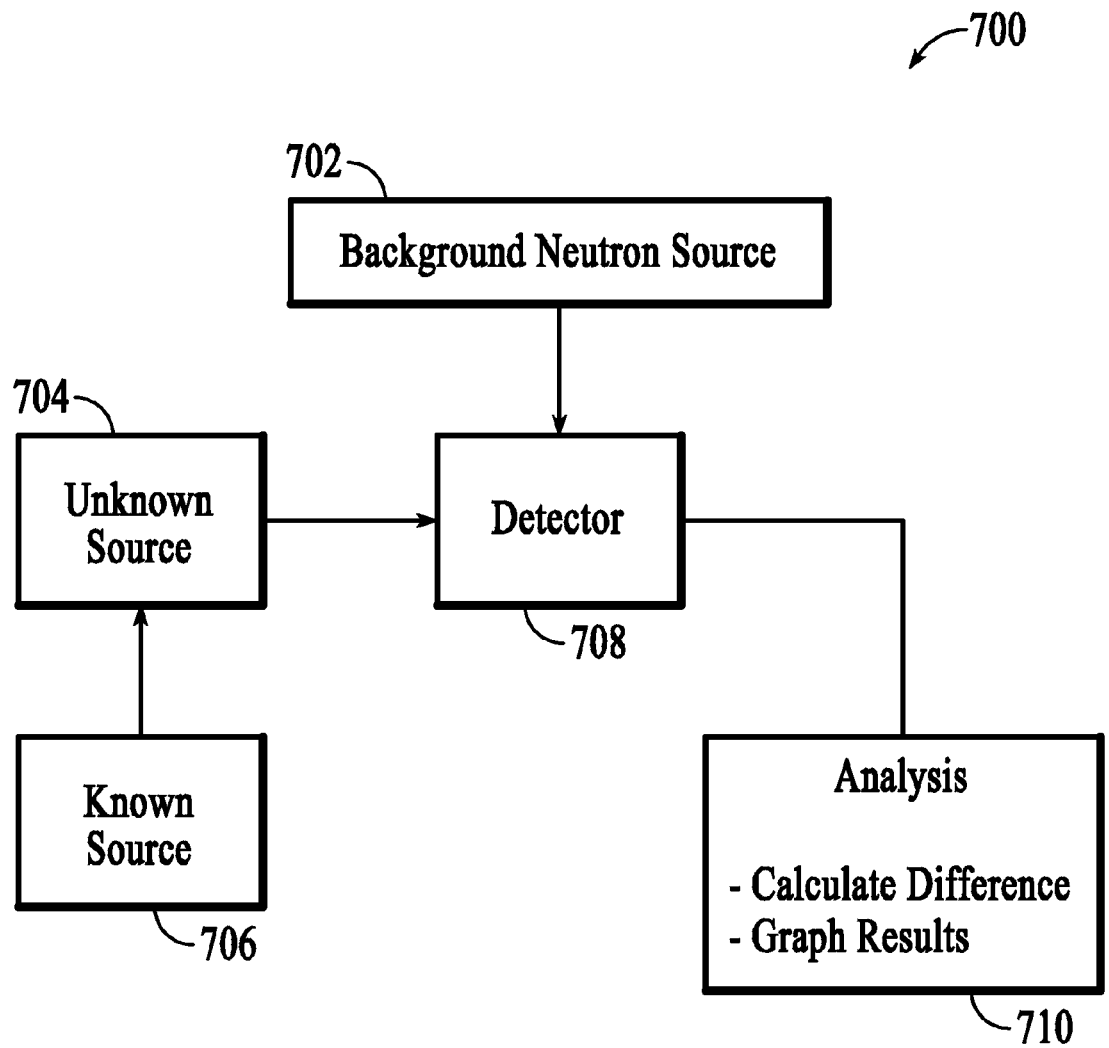
FIG. 7 illustrates a neutron detection system with active interrogation, under an embodiment.

In one embodiment, the detection system includes a module that allows for active interrogation of an unknown neutron source. This system includes a source of neutrons, such as Californium (Cf) or Americium-Beryllium (AmBe) placed at a known distance from the unknown source. The active interrogation due to the presence of a neutron source effectively forces neutrons into the source and results in more fissions. This generally increases the speed in which the neutron distribution for the unknown source is generated. The resulting neutron distribution is then observed. FIG. 7 illustrates a neutron detection system with active interrogation, under an embodiment. In system 700, unknown source 704 is placed in the proximity of detector 706. The detector 706 also picks up neutron emissions from background source 702. To counteract the effects of this background noise, a known source 708 is used to drive neutrons into the unknown source 704. The resulting neutron emission distribution is then plotted relative to a Poisson distribution, and a graph, such as that shown in FIG. 3 is displayed using graph generator 710. The active interrogation system of FIG. 7 can increase the strength of the unknown source above the ten to one ratio relative to the background, thus allowing greater possibility of detection from unnatural sources.

The distribution curves 601, 602, and 603 shown in FIG. 6 provide a graphical basis on which an analyst can view and identify man-made or environmental sources of neutrons. The difference in counts above the mean, that is, in the upper portion of each curve, along with the shape of the curve can be used to characterize the criticality of the hazard posed by an unknown source relative to the background and Poisson distributions. In one embodiment, analysis of the graphical neutron distribution data as generated by the neutron detection system can be viewed and analyzed by a human operator. Alternatively, the graphical distribution data can be further processed in a program or electronic module to provide an interpretation of the data. This module can be configured to analyze one or more parameters associated with the distribution plot such as shape, rate of rise of a portion of the curve, point-by-point differences with the Poisson and/or environmental neutron plots, and so on. Such interpretation information can be used by a user or a further response system to trigger an appropriate response to the unknown source, such as sounding an alarm, ordering an evacuation, initiating an automatic detonation sequence, or any other appropriate action.

In one embodiment, the neutron detector system of FIG. 2 can be embodied within a portable device that can be deployed in the field and used by personnel to detect the presence of potentially dangerous sources of radioactive material from virtually any type of object or item. The packaging around any such source can be shielded or unshielded. Such a detector system can also be used in any type of Nuclear Instrumentation Module (NIM) for use in experimental particle or nuclear physics.

Embodiments of the present invention are suitable to provide a simple, quick approach that minimally trained operators can use to improve the control of fissioning material. The operators, for example may include border or traffic police, baggage handlers or freight companies, or for international treaty agreements that endeavor to identify, segregate, or manage the world's inventories of nuclear material.

Embodiments are directed to a method of characterizing a radiation source as fissile material or non-fissile material, comprising the steps of: counting neutrons emitted from the radiation source; defining a measurement time period; determining the number of times that a group of n simultaneously emitted neutrons is observed from the radiation source after the measurement time period is repeated a defined number of times to derive a neutron count measurement; subtracting an expected number of pairs of neutrons emitted by a hypothetical non-fission Poisson neutron source during the measurement time period from the number of pairs of observed neutrons derived from the neutron count measurement; characterizing the radiation source as fissile material if the number of pairs of observed neutrons exceeds the expected number of pairs of neutrons; and producing a histogram representing the number of times different group sizes occur from a number of measurement time periods; deriving a Poisson count distribution for the Poisson neutron source; and overlaying the histogram and the Poisson count distribution to provide a visual indication of the difference in correlation of emitted neutrons from the radiation source, for the purpose of distinguishing fissile material from non-fissile material. In an embodiment of the method, the defined measurement time period is ½ msec. The fissile source creates real correlations between emitted neutrons, and a non-fissile source creates no correlation or only accidental correlations between emitted neutrons. The fissile source may comprise an illicitly trafficked neutron source.

Embodiments are further directed to a method of characterizing a radiation source as fissile material or non-fissile material, comprising: measuring the number of neutrons simultaneously emitted from the radiation source during a number of measurement time periods to derive a multiplet count distribution; computing the mean count rate of the multiplet count distribution; computing the number of pairs of the multiplet count distribution; using the mean count rate to produce a Poisson distribution for the mean count rate; computing the expected number of pairs for a Poisson distribution; subtracting the expected number of pairs for the Poisson distribution from the number of pairs in the measurement; characterizing the radiation source as fissile material if the number of pairs in the measurement exceeds the number of pairs for the Poisson distribution; producing a hypothetical histogram for the Poisson distribution; producing a count histogram for the count measurement representing the number of times different group sizes occur from the number of measurement time periods; and overlaying the histogram and the Poisson count distribution in such a way as to make the mean count of the hypothetical histogram the same as for the count histogram and to provide a visual indication of the difference in correlation of emitted neutrons from the radiation source, for the purpose of characterizing the neutron source as fissile material or non-fissile material. The method may further comprise the step of determining the value of a coefficient, Cn, which represents the number of times that a group of n neutrons is observed after repeating a ½ millisecond measurement time period a defined number of times, and wherein the mean count is calculated by the formula:

$$\overline{C} = \frac{\sum_{n=0}^{\infty} nCn}{\sum_{n=0}^{\infty} Cn}$$

In this method, the shape of the histogram representation of the count measurement may be given by the formula:

$$\text{Cn-poisson} = \frac{\bar{c}^n}{n!} e^{-\bar{c}}$$

Aspects of the circuitry and methodology may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the memory test process may be embodied in microprocessors having software-based circuit emulation, discrete logic (sequential and combinatorial), custom devices, fuzzy (neural) logic, quantum devices, and hybrids of any of the above device types. As is understood in the art of electronic circuit manufacture, a number of different underlying device technologies may be provided in a variety of component types.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While embodiments may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of determining whether a radiation source has the characteristic of fission, comprising the steps of:
   counting neutrons emitted from the radiation source;
   defining a measurement time period;
   determining the number of times that a group of n simultaneously emitted neutrons is observed from the radiation source after the measurement time period is repeated a defined number of times to derive a neutron count measurement;
   subtracting an expected number of pairs of neutrons emitted by a hypothetical non-fission Poisson neutron source during the measurement time period from the number of pairs of observed neutrons derived from the neutron count measurement to provide a calculated result;
   determining if the number of pairs of observed neutrons exceeds the expected number of pairs of neutrons by a defined error range for each subtraction of the expected number of pairs of neutrons from the observed number of pairs of neutrons, wherein the defined error range represents a statistical measure that is indicative of fission by the observed neutrons;
   producing a histogram representing the number of times different group sizes occur from a number of measurement time periods;
   deriving a Poisson count distribution for the Poisson neutron source; and
   overlaying the histogram and the Poisson count distribution to provide a visual indication of the difference provided by the calculated result, wherein a difference between the number of pairs of observed neutrons and the expected number of pairs of neutrons in excess of the defined error range in at least a portion of the overlaid histogram and Poisson count distribution characterizes the radiation source as fissile.

2. The method of claim 1 further comprising accounting for background radiation to characterize the source as fissile or non-fissile based on the visually indicated difference and the background radiation.

3. The method of claim 2 wherein the step of accounting for background radiation comprises filtering out the background radiation from the count of neutrons emitted from the radiation source by selecting a device or source parameter such that a count rate of the radiation source is significantly higher than the count rate of the background radiation.

4. The method of claim 3 wherein the device or source parameter selected to filter out the background radiation comprises at least one of: a mass of the radiation source, a multiplication factor, and an efficiency of a detector determining the number of times that the group of n simultaneously emitted neutrons is observed.

5. A method of determining whether a radiation source has the characteristic of fission, comprising:
   measuring the number of neutrons simultaneously emitted from the radiation source during a number of measurement time periods to derive a multiplet count distribution;
   computing the mean count rate of the multiplet count distribution;
   computing the number of pairs of the multiplet count distribution;
   using the mean count rate to produce a Poisson distribution for the mean count rate;
   computing the expected number of pairs for a Poisson distribution;

defining an error range for each count of the multiplet count distribution, wherein the defined error range represents a statistical measure that is indicative of fission of the radiation source;

subtracting the expected number of pairs for the Poisson distribution from the number of pairs in the measurement to produce a calculated result;

characterizing the radiation source as fissile material if the number of pairs in the measurement exceeds the number of pairs for the Poisson distribution by the at least the error range for each respective count; and producing a hypothetical histogram for the Poisson distribution;

producing a count histogram for the count measurement representing the number of times different group sizes occur from the number of measurement time periods; and overlaying the histogram and the Poisson count distribution in such a way as to make the mean count of the hypothetical histogram the same as for the count histogram and to provide a visual indication of the difference provided by the calculated result; and accounting for background radiation to characterize the source as fissile or non-fissile based on the visually indicated difference and the background radiation.

6. The method of claim 5 further comprising the step of determining the value of a coefficient, Cn, which represents the number of times that a group of n neutrons is observed after repeating a ½ millisecond measurement time period a defined number of times, and wherein the mean count is calculated by the formula:

$$\overline{C} = \frac{\sum_{n=0}^{\infty} nCn}{\sum_{n=0}^{\infty} Cn}$$

7. The method of claim 6 wherein the shape of the histogram representation of the count measurement is given by the formula:

$$\text{Cn-poisson} = \frac{\overline{c}^n}{n!} e^{-\overline{c}}$$

8. The method of claim 5 further comprising filtering out background radiation by selecting a device or source parameter such that a count rate of the radiation source is significantly higher than the count rate of the background radiation.

9. The method of claim 8 wherein the device or source parameter selected to filter out the background radiation comprises at least one of: a mass of the radiation source, a multiplication factor, and an efficiency of the detector determining the number of times that the group of n simultaneously emitted neutrons is observed.

* * * * *